(12) United States Patent
Thornber et al.

(10) Patent No.: US 6,900,805 B2
(45) Date of Patent: May 31, 2005

(54) TORRANCE-SPARROW OFF-SPECULAR REFLECTION AND LINEAR SUBSPACES FOR OBJECT RECOGNITION

(75) Inventors: Karvel K. Thornber, Berkeley Heights, NJ (US); David W. Jacobs, Bethesda, MD (US)

(73) Assignee: NEC Laboratories America, Inc., Princeton, NJ (US)

( * ) Notice: Subject to any disclaimer, the term of this patent is extended or adjusted under 35 U.S.C. 154(b) by 449 days.

(21) Appl. No.: 10/230,888

(22) Filed: Aug. 29, 2002

(65) Prior Publication Data

US 2004/0041809 A1 Mar. 4, 2004

(51) Int. Cl.$^7$ .............................................. G06T 15/00
(52) U.S. Cl. ..................................................... 345/426
(58) Field of Search ............................... 345/426, 419, 345/418; 356/445, 446

(56) References Cited

U.S. PATENT DOCUMENTS

| 5,495,562 A | * | 2/1996 | Denney et al. ............. 345/421 |
| 5,923,334 A | * | 7/1999 | Luken ........................ 345/423 |

OTHER PUBLICATIONS

Oren et al., Generalization of Lambert's Reflectance Model, Jul. 1994, Proceedings on 21st conferences on Computer Graphics, p.p. 1–30.*
Boivin et al., Image–Based Rendering of Diffuse, Specular and Glossy Surfaces from a Single Image, ACM SIG-GRAPH 2001 Aug. 2001, pp. 107–116.*
Brelstaff, et al., "Detecting Specular Reflections Using Lambertian Constraints," International Conference on Computer Vision, pp. 297–302 (1988).
Cabral et al., "Bidirectional Reflection Functions from Surface Bump Maps," Computer Graphics, vol. 21, No. 4, pp. 273–281 (1987).
Coleman et al., "Obtaining 3–Dimensional Shape of Textured and Specular Surfaces Using Four–Source Photometry," Physics–Based Vision Principles and Practice, Shape Recovery, pp. 180–199 (1992).
Hallinan, "A Low–Dimensional Representation of Human Faces for Arbitrary Lighting Conditions," IEEE Conf. on Computer Vision and Pattern Recognition, pp. 995–999 (1994).
Marschner et al., "Image–Based BRDF Measurement Including Human Skin," In Proceedings of 10th Eurographics Workshop on Rendering, pp. 139–152 (1999).
Ramamoorthi et al., "On the Relationship Between Radiance and Irradiance: Determining the Illumination from Images of a Convex Lambertian Object," Journal Optical Society of America A, vol. 18, No. 10, pp. 2448–2459 (2001).
Ramamoorthi et al., "A Signal–Processing Framework for Inverse Rendering," Computer Graphics Proceedings, Annual Conference Series, pp. 117–128 (2001).
Yuille et al., "Determining Generative Models of Objects Under Varying Illumination: Shape and Albedo from Multiple Images Using SVD and Integrability," International Journal of Computer Vision, pp. 1–35 (1999).
Basri et al., "Lambertian Reflectance and Linear Subspaces," IEEE International Conference on Computer Vision, II, pp. 282–290 (2001).
Belhumeur, et al., "What is the Set of Images of an Object Under all Possible Illumination Conditions?" International Journal of Computer vision, vol. 28, No. 3, pp. 245–260 (1998).
Hayakawa, "Photemetric Stereo Under a Light Source with Arbitrary Motion," Journal of Optical Society of America, vol. 11, No. 11, pp. 2079–2089 (1994).
Koenderink et al., "The Generic Bilinear Calibration–Estimation Problem," International Journal of Optical Computer Vision, vol. 23, No. 3, pp. 217–234 (1997).
Langer, "When Shadows Become Interreflections," International Journal of Computer Vision, vol. 34, No. 2–3, pp. 193–204 (1999).
Rose, "Elementary Theory of Angular Momentum," John Wiley & Sons, New York, pp. 228–234 (1957).
Shashua, "On Photometric Issues in 3D Visual Recognition from a Single 2D Image," International Journal of Computer Vision, vol. 21, No. 1–2, pp. 99–122 (1997).
Blinn, "Models of Light Reflection for Computer Synthesized Pictures," Computer Graphics, pp. 192–198 (1977).
Rense, "Polarization Studies of Light Diffusely Reflected from Ground and Etched Glass Surface," Journal of the Optical Society of America, vol. 40, No. 1, pp. 55–59 (1950).
Basri et al., "Lambertian Reflectance and Linear Subspaces," NEC Research Institute, Inc. Technical Report No. 2000–112 (2000).
Basri et al., "Lambartain Reflectance and Linear Subspaces," NEC Research Institute, Inc. Technical Report No. 2000–172R (2000).

* cited by examiner

Primary Examiner—Phu K. Nguyen

(57) ABSTRACT

The Torrance-Sparrow model of off-specular reflection is recast in a significantly simpler and more transparent form in order to render a spherical-harmonic decomposition more feasible. By assuming that a physical surface consists of small, reflecting facets whose surface normals satisfy a normal distribution, the model captures the off-specular enhancement of the reflected intensity distribution often observed at large angles of incidence and reflection, features beyond the reach of the phenomenological broadening models usually employed. In passing we remove a physical inconsistency in the original treatment, restoring reciprocity and correcting the dependence of reflectance on angle near grazing incidence. It is noted that the results predicted by the model are relatively insensitive to values of its one parameter, the width of the distribution of surface normals.

10 Claims, No Drawings

TORRANCE-SPARROW OFF-SPECULAR REFLECTION AND LINEAR SUBSPACES FOR OBJECT RECOGNITION

BACKGROUND OF THE INVENTION

1. Field of Invention

The present invention relates generally to machine vision, and more particularly, to a method of modeling the off-specular reflection of light to allow a machine to recognize the image of an object illuminated by varying unknown lighting conditions.

2. Description of Related Art

It is clear that changes in lighting can have a large effect on how an object, such as a person, looks. Understanding this is essential to building effective object recognition systems.

While the Lambertian (or uniform) model of the scattering of light from real surfaces is central to any study of object illumination, more sophisticated modeling is essential. In general, a variety of conditions combine to introduce anomalies into the simple model, especially those related to specular reflection (strong scattering over a narrow range of angles) and geometrically induced shadows. Recently, consideration has been given to the examination of the harmonic components of broadened, specular reflection, and the harmonics of cast shadows.

U.S. patent application Ser. No. 09/967,206 filed Sep. 28, 2001, entitled "Broadened-Specular Reflection and Linear Subspaces for Object Recognition", the disclosure of which is hereby incorporated by reference, considered harmonic components of broadened, specular reflection in the Phong model.

While the Phong model is mathematically contrived, the Torrance-Sparrow model upon which the present invention is based, is a physically motivated model.

In addition, while the Phong model could be put into a reasonably tractable form by means of standard harmonic analysis, this is an unreasonable goal for the Torrance-Sparrow model. In accordance with the teachings of the present invention, a modified harmonic analysis was used which still enabled an approximation much more readily in the state space of spherical harmonics than in pixel space as graphics people usually do. In the previous invention, the higher harmonics were discarded. In the present invention the higher harmonics are kept in a modified (approximate) form, more approximate the less important the harmonics are.

Most importantly, the present invention makes use of simpler functions where arguments capture more of the angular dependencies than is possible with the usual expansions.

U.S. patent application Ser. No. 09/705,507, filed Nov. 3, 2000, entitled "Lambertian Reflectance and Linear Subspaces", the disclosure of which is hereby incorporated by reference, considered the relationship between the function that describes the lighting intensity, and the reflectance function that describes how much light an object reflects as a function of its surface normal, under a given lighting condition. Representing these functions as spherical harmonics, it was shown that for Lambertian reflectance the mapping from lighting to reflectance is a convolution with a nearly perfect low-pass filter. High-frequency components of the lighting hardly affect the reflectance function. Therefore, nearly all Lambertian reflectance functions could be modeled as some linear combination of nine spherical harmonic components.

These low-dimensional approximations have two key advantages. First, they are described with few parameters, thus optimization is simpler. Moreover, the images produced under low-frequency lighting are inherently immune to small changes in orientation. A small rotation in the surface normal is equivalent to a small rotation in the light. However, low-frequency light does not appreciably change with a small rotation. The analysis shows this, in that an image produced by an $n^{th}$ order harmonic light component is computed by taking an $n^{th}$ degree polynomial of the components of the surface normal.

While promising, the invention described in U.S. patent application Ser. No. 09/705,507 considered only Lambertian reflectance. Specular reflectance, described in U.S. patent application Ser. No. 09/967,206, can significantly affect how an object appears. For example, a human face may have some oiliness, particularly on the forehead, which reflects light specularly. This is seen as highlights on the object.

While the invention described in U.S. Ser. No. 09/705,507 involved only Lambertian reflection, the Phong model is a simple mathematical rendering of diffuse specular reflectance. The Torrance-Sparrow model underlying the present invention is a fundamental improvement to make the reflectance physically accurate, a necessity for face recognition.

Specular reflectance cannot be approximated well by only considering low-dimensional linear subspaces which capture only low-frequency lighting. Intuitively, the set of possible reflectance functions for a perfect mirror is the same as the set of possible lighting functions. The question remains how to cope with specularity in object recognition using models that will inevitably be imperfect.

Specularities are often thought of as mainly present in spatially localized highlights, which occur when a bright light source is reflected by a shiny object. Such highlights can potentially be identified in the image and processed separately. For example, the algorithms described by Coleman, et al., in "Obtaining 3-Dimensional Shape of Textured and Specular Surfaces Using Four-Source Photometry", *Physics-Based Vision Principles and Practice, Shape Recovery*, pp. 180–199 (1992), and by Brelstaff, et al., in "Detecting Specular Reflection Using Lambertian Constraints", *International Conference on Computer Vision*, pp. 297–302 (1988), treat specular pixels as statistical outliers that should be discarded. However, specularities due to low-frequency lighting can be spread out throughout the entire image. Since these specularities affect every pixel in the image, their effect must be better understood; they cannot simply be discarded.

Some previous works have considered specular effects also as convolutions. Basri, et al. in NEC Research Institute Technical Report No. 2000-112, entitled "Lambertian Reflectance and Linear Subspaces" (August 2000) as revised in Technical Report No. 2000-172R (December 2000) considered a version of the Phong model in which the specular lobe is a rotationally symmetric shape centered about a peak that is a 180-degree rotation of the direction of the incoming light about the surface normal. In such a model, specular reflection doubles the frequency of the incoming light, and then acts as a convolution. However, this model is heuristic, and not physically based. It does not extend to realistic models.

Ramamoorthi, et al., in "On the Relationship between Radiance and Irradiance: Determining the Illumination From Images of a Convex Lambertian Object", *Journal of*

*the Optical Society of America A*, Vol. 18, No. 10, pp. 2448–2459 (2001), considered the effects of arbitrary bi-directional reflectance distribution functions (BRDFs) on the light field. They were able to develop algorithms for recovering the BRDF and/or the lighting given a measured light field and an object with a known 3D structure. Though interesting, these results are not generally applicable to machine vision because, without special sensing devices, the light field is not available. An image of an object is produced by the reflectance function that describes how the surface normals reflect light in one fixed direction. Therefore, an image corresponds to a 2D slice through the light field. For an arbitrary BRDF, the 2D reflectance function for a fixed viewpoint no longer results from a convolution of the lighting.

BRIEF SUMMARY OF THE INVENTION

The goal of the present invention is to allow a machine, such as a computer, to match an input image of an object, such as a human face, to an object model stored in a database associated with the machine, and to perform this matching with a high degree of accuracy.

The steps of the recognition method of the present invention include providing a database of three-dimensional object models, providing an input image, positioning each three dimensional model relative to the input image, determining an optimal rendered image of the model that is most similar to the input image, computing a measure of similarity between the input image and the optimal rendered image of each model, and selecting the object whose optimal rendered image is most similar to the input image. The step of determining an optimal rendered image includes deriving a reflectance function for each object that includes the effects of both broadened-specular and diffuse reflection, and optimizing that reflectance function to most closely match the input image.

The described method of the present invention includes rendering the images produced by an object model when illuminated only by the fundamental along with each harmonic component of light to create the effect that there are no negative regions, or some other combinations which still cover all the harmonics of interest. The summation of these components defines the reflectance function for the object model. The derived reflectance function takes into account the intensity of light components incident on the object model, the intensity of light diffusely reflected from the model, and the intensity of off-light specularly reflected from the model, the last component being dependent on the angle between the direction of the observer and the direction of maximum specular reflection.

The advance in the art provided by the present invention resides in the fact that unlike the Lambertian case in which the reflectance depends only on the surface normal, and only harmonics of the surface normal are considered, the reflectance expressed by any model including off-specular reflection involves two coupled dependencies, that on the surface normal and that on the direction of the reflected light. The number of terms in such an expansion grows only as $n^2$ for the Lambertian, but as $n^4$ for diffuse, specular reflection, and in addition n is larger for the latter case. The term "n" is the harmonic which is sometimes referred to as "l" in the text below. This complexity is avoided by using knowledge of physically correct, specular reflection to preserve both dependencies in a single harmonic expansion by using harmonics of a modified direction dependent on both the surface normal and the reflected direction of interest, returning the complexity to $n^2$. This result is somewhat analogous to having a spatial Fourier series in a plane (2D). For arbitrary surfaces one has products of Fourier components in the x and the y directions. However, if one knows the structure is roughly circular, or colinear, or some other symmetry, a 1D modified expansion may suffice, not simply x or y, but in a combination appropriate to the problem.

A principal object of the present invention is therefore, the provision of a method of modeling the off-specular reflection of light from an object to allow a machine to recognize the image of an object illuminated by varying lighting conditions.

Another object of the present invention is the provision of a method of modeling the off-specular reflection of light from an object using a modified Torrance-Sparrow model of the object to allow a machine to recognize the image of an object illuminated by varying lighting conditions.

A further object of the present invention is the provision of a method of modeling the off-specular reflection of light from an object using a modified Torrance-Sparrow model of the object to allow a machine to recognize the image of an object illuminated by varying lighting conditions for use in face recognition.

Further and still other objects of the present invention will become more clearly apparent when reading the following description of the invention

DETAILED DESCRIPTION OF THE INVENTION

Although detailed and/or microscopic models of reflection exist, these apply principally to homogeneous, rigid, material surfaces. For reflection from inhomogeneous, flexible surfaces such as faces, where most of the features of interest are configurational, a more robust model that captures the most important aspects of the scattered light is more appropriate. Thus the Lambertian model, which simply scatters incident radiation equally into the hemisphere above each surface element, is usually chosen.

The method of the present invention involves a much more complicated, physical model of reflectance developed by Torrance and Sparrow. The Torrance-Sparrow model of off-specular reflection is recast in a significantly simpler and more transparent form in order to render a spherical-harmonic decomposition more feasible. By assuming that a physical surface consists of small, reflecting facets whose surface normals satisfy a normal distribution, the model captures the off-specular enhancement of the reflected intensity distribution often observed at large angles of incidence and reflection, features beyond the reach of the phenomenological broadening models usually employed. The results predicted by the new model are relatively insensitive to values of its one parameter, the width of the distribution of surface normals. This is accomplished using both physical intuition and mathematical simplification. The result is an extraction of the principal dependences in the harmonic representation with a minimum of dependence on the details of the model.

Torrance-Sparrow Reflection Model (TSRM)

Torrance and Sparrow presented a physical model which captured several seemingly anomalous features of broadened, specular reflection from surfaces of metals and insulators. These features included off-specular maxima in the reflected intensity distribution and comparatively larger relative reflectance at larger angles of incidence. Neither of these features could be included in phenomenological broadening models such as the simpler Phong model which lacked both.

The model may be described as follows: the surface is taken to comprise a distribution of small, randomly-oriented, mirror-like facets, and the effects of shadowing and masking of facets by adjacent facets are included. Such roughened surfaces are the usual result of fabricating non-single-crystal samples. The off-specular maxima and enhanced reflectance result from the larger number of facets available for scattering at large angles of incidence. For example, in the limit of grazing incidence, the facet normal can vary by $\pi$ radians in an arc orthogonal to both the plane of incidence and the nominal surface leaving the incident and reflected directions invariant.

In the following simplified derivation, there is a direct finding of Blinn's compact expressions for the shadowing/masking factor G and a slight altering of the facet-orientation distribution function. A detailed description of Blinn's work is found in the article J. F. Blinn, "Models of Light Reflection for Computer Synthesized Pictures", Computer Graphics 11 (2), pp. 192–198 (1977). The masking factor G is described in detailed below. The present model removes a physical inconsistency in the original treatment, one which has been carried forward verbatim in nearly all subsequent discussions. This is significant since in its present form the TSRM cannot account even qualitatively for the experimentally-observed, off-specular reflection at high angles of incidence. A primary concern in the present invention is to represent the reflection in terms of spherical harmonics of the incoming illumination, analogous to prior treatments.

The Shadowing-Masking Factor G

As one would expect of scattering from a rough, faceted surface, a good deal of local masking and shadowing would occur between the facets. While some of this contributes to the diffuse (Lambertian) scattering observed, most is light scattered only once. The TSRM treats this by assuming that each facet of normal $n_\gamma$ is paired with a complementary facet of normal $n'_\gamma (n'_\gamma = 2(n \cdot n_\gamma)n - n_\gamma)$ forming a V-shaped, trough-like local structure. In general, only a fraction (G) of the light falling on a trough can reach a reflecting surface, be reflected, and exit the trough without being shadowed on entering or masked on exiting. This purely geometric factor is G: $0 \leq G \leq 1$, and is independent of the depth (or size) of the trough.

Torrance and Sparrow provide a complicated, trigonometric derivation whose result was greatly compacted by Blinn, and is given in below. We provide a simple, direct derivation which includes other useful forms for G as well.

Consider a ray of light $n_e$ reflected off the surface of a facet $n_\gamma$ at a distance of x (along the facet) from the bottom of the trough, and exiting the trough by just grazing the upper edge of the adjoining facet of normal $n'_\gamma$ (at a distance y (along the facet) from the bottom of the trough). Since any light reflected in direction $n_e$ forms an interior angle of $\beta$ with facet $n_\gamma$ and $\alpha$ with facet $n'_\gamma$, $\sin\beta = n_e \cdot n_\gamma$ and $\sin\alpha = -n_e \cdot n'_\gamma$. But by the law of sines $x/y = \sin\alpha/\sin\beta$: hence $x/y = -n_e \cdot n'_\gamma / n_e \cdot n_\gamma$, and therefore $$G_b = (n_e \cdot n_\gamma + n_e \cdot n'_\gamma)/n_e \cdot n_\gamma$$

But $n'_\gamma = 2(n \cdot n_\gamma)n - n_\gamma$ ($n'_\gamma$ is just the reflection of $n_\gamma$ about n, the nominal surface normal). Hence, $G_b = 2(n \cdot n_\gamma)(n \cdot n_e)/n_\gamma \cdot n_e$. $G_b = 2(n \cdot n_\gamma)(n \cdot n'_e)/n_\gamma \cdot n'_e$ is found similarly, or just by reciprocity, replacing the outgoing $n_e$ with the incoming $n'_e$. We note in passing that $(n_\gamma + n'_\gamma) = (2 + 2n_\gamma \cdot n'_\gamma)^{1/2} n$, rendering $$G_b = (2 + 2n_\gamma \cdot n'_\gamma)^{1/2} n \cdot n_e / n_\gamma \cdot n_e$$

which is yet another form for $G_b$. Strictly speaking, $n_e$ includes a component parallel to the lateral ($n_\gamma \times n'_\gamma$) axis of the trough, and although neither $n_\gamma$ nor $n'_\gamma$ has a corresponding component, this component does enter the normalization of $n_e$. However, as only the ratio of the two dot products enters, use of the full $n_e$ and $n'_e$ is justified.

Broadened, Specular Reflection in TSRM

Given a distribution of facets $f(n_\gamma)$, where $n_\gamma$ is the facet normal, the specular reflection $r_{TS}$ of incident lumination $L(n_i)$ can be written as $$r_{TS}(n_e, n) = u(n \cdot n_e) \int dn_i L(n_i) \int dn_\gamma f(n_\gamma) \ G(n, n_\gamma, n_e) \delta(n_i - n'_e)$$

where $n_i$ is the (negative) direction of the incident light, $n_e$ is the direction of interest of the reflected light, n is the normal of the nominal surface in the region of interest, and $n'_e = (2n_\gamma(n_\gamma \cdot n_e) - n_e)$ is the incident spectral direction corresponding to $n_e$ for a facet whose normal is $n_\gamma$. The term $u(x)$ is the unit step function: $u(x)=0$ for $x<0$, $u(x)=1$ for $x>0$. The term $u(n \cdot n_e)$ ensures that only regions of the surface capable of reflecting light into $n_e$ are considered. (The corresponding criterion for incident light, $u(n \cdot n_i)$, is included in the shadowing/masking factor G.) The Fresnel factor included by Torrance and Sparrow has been omitted. All vectors $n_k$ are normalized.

Assume a facet distribution of normals of the form $$f(n_\gamma) = \exp(\gamma n \cdot n_\gamma)/N$$

$$N = 2\pi(e^\gamma - 1)/\gamma$$

The normalization N is such that the integral of $f(n_\gamma)$ over the hemisphere where $n \cdot n_\gamma > 0$ is unity. This differs only slightly in form from the Gaussian distribution in the angle $\alpha$ ($n \cdot n_\gamma = \cos\alpha \approx 1 - \alpha^2/2$) used in the TSRM. This change, though minor numerically, offers significant algebraic simplification. (The heart of our distribution is therefore $\exp(-\gamma\alpha^2/2)$ while that of TSRM is $\exp(-c^2\alpha^2)$. The TSRM $c = 0.05/$degree works out to $c^2 = 8.207/\text{radian}^2$, corresponding to a $\gamma$ of 16.414. In the present invention $\gamma = 5$, 10 and 20 were chosen for the numerical work.)

As discussed above, the shadowing/masking factor G is given by $$G(n, n_\gamma, n_e) = \max(0, \min(1, G_b, G_c))$$

$$G_b = 2n \cdot n_\gamma \left(\frac{n \cdot n_e}{n_\gamma \cdot n_e}\right), \ G_c = 2n \cdot n_\gamma \left(\frac{n \cdot n'_e}{n_\gamma \cdot n'_e}\right)$$

Clearly $0 \leq G \leq 1$: $G=1$ when the reflection is such that there is neither masking nor shadowing of the incident or reflected light; $G = G_b$ when some of the reflected light is masked, which can only occur when $n \cdot n_e < n \cdot n'_e$; $G = G_c$ when some of the incident light is shadowed, which can only happen when $n \cdot n'_e < n \cdot n_e$: $G_b < G_c$ and $G_c < G_b$, respectively. (Since $n_\gamma$ is the normal of the specularly reflecting facet, $n_{\gamma \cdot n_e} = n_\gamma \cdot n'_e$.) (It should be noted that whereas most treatments of TSRM consider the reflected distribution in $n_e$ for fixed $n_i$, our primary interest is the reflected light in direction $n_e$ for a given distribution in $n_i$. This means that the most strongly reflected light will come from $n_i$ where $n \cdot n_i < n \cdot n_e$. By reciprocity, this concurs with the usual case where light reflected from a fixed $n_i$ to some $n_e$ is maximized for $n \cdot n_i > n \cdot n_e$.)

The expression for $r_{TS}$ can be readily cast into a spherical-harmonic form: First recall $$\delta(n_i - n'_e) = \Sigma_{lm} Y_{lm}(n'_e) Y^*_{lm}(n_i)$$

It is also advantageous to change the variable of the remaining integration from $n_\gamma$ to $n_e$. As in Torrance and Sparrow, this is done to express the integrand in terms of the solid angle of the reflected (TS) or the incident (here) light. Torrence and Sparrow refer to previous work of W. A. Rense in the Journal of Optical Society of America, 40, pp 55ff (1950) for this conversion. However, it is readily possible to derive the result by using $n'_e = 2n_\gamma(n_\gamma \cdot n_e) - n_e$ as follows: we can change $n_\gamma$ to $n_\gamma + dn_\gamma$ in only two dimensions, either perpendicular to $n_\gamma$ and $n_e$, $dn_{\gamma\perp}$, or in the plane of $n_\gamma$ and $n_e$ (the plane of reflection) but perpendicular to $n_\gamma$, $dn_{\gamma\|}$. (As $n_\gamma$ is of unit length, being a normal vector, $n_\gamma \cdot dn_\gamma = 0$.) Thus $dn'_{e\perp} = 2dn_{\gamma\perp}(n_\gamma \cdot n_e) + 2n_\gamma(dn_{\gamma\perp} \cdot n_e) = 2(n_\gamma \cdot n_e)dn_{\gamma\perp}$ as $dn_{\gamma\perp} \cdot n_e = 0$. Similarly $dn'_{e\|} = 2dn_{\gamma\|}$. This is more readily seen by noting that in the plane of reflection the change in the angle between incident and reflected rays is double the change between incident and normal. Thus $dn_\gamma = dn'_e/4(n_\gamma \cdot n_e)$, and $r_{TS}$ takes the form $$r_{TS}(n_e, n) = u(n_e \cdot n) \Sigma_{lm} L_{lm} R_{lm}(n_e, n)$$

$$R_{lm}(n_e, n) = \int dn'_e Y_{lm}(n'_e) G(n, n_\gamma, n_e) e^{\gamma n \cdot n_\gamma} / 4N(n_\gamma \cdot n_e)$$

$$L_{lm} = \int dn_i L(n_i) Y^*_{lm}(n_i)$$

Here of course, $n_\gamma$ satisfies $n'_e = (2n_\gamma(n_\gamma \cdot n_e) - n_e)$.

Missing in the above expression is the $(n_\gamma \cdot n'_e)/(n \cdot n_e)$ factor present in Torrance and Sparrow, and in Blinn. The factor arises because in passing from intensities to fluxes and then back to intensities, Torrance and Sparrow perform the first conversion as if the reflection were due to individual facets, which is correct, but the second conversion is performed as if the reflection were due to the average surface, which is incorrect. The correct factor is, therefore, $(n_\gamma \cdot n'_e)/(n_\gamma \cdot n_e)$ which, of course, is unity. The present invention avoids this unnecessary complication and the result satisfies reciprocity while TSRM's does not.

Spherical-Harmonic Factor $R_{lm}(n_e, n)$

For any reasonable $\gamma$ (e.g. $\gamma > 10$), the $[G \exp(\gamma n \cdot n_\gamma)/(n_\gamma \cdot n_e)] = F$ factor reaches a maximum for $n \cdot n_\gamma \approx 1$, and the maximum is comparatively sharp, at least for the relatively low values of lm of interest. The change of variables from $n_\gamma$ to $n'_e$ ensures that the domain of $n'_e$, $dn'_e$, is well-contained even for relatively small $(n_\gamma \cdot n_e)$: recall $dn'_e = 4(n_\gamma \cdot n_e)dn_\gamma$. Also, it is the diminishing value of the $(n_\gamma \cdot n_e)$ factor which leads to larger reflectance for larger angles of incidence: for smaller $(n_\gamma \cdot n_e)$, a larger fraction of the facets contribute to the reflection.

Now, first calculate the value $n_{\gamma c}$ of $n_\gamma$ which maximizes F. The result is that there are two regions in $(n \cdot n_e)$ to be considered: $n \cdot n_e > n \cdot n_{eg}$ where the maximum occurs for $G = 1$; $n \cdot n_e < n \cdot n_{eg}$ where the maximum occurs for $G_c = 1$ and $n_{\gamma c} = n_{\gamma g}$. The critical value $n \cdot n_{eg}$ depends only on $\gamma$; the larger $\gamma$, the larger $n \cdot n_{eg}$. From $n_{\gamma c}$ we can obtain $n'_{ec} = 2n_{\gamma c}(n_{\gamma c} \cdot n_e) - n_e$ and take $Y_{lm}(n'_{ec})$ out of the integral in $R_{lm}(n_e, n)$. Then the remaining integral can be approximated as a two-dimension Gaussian integral and evaluated.

First calculate the facet normal $n_{\gamma c}$ which maximizes F for $G = 1$. One method is to differentiate with respect to $n \cdot n_\gamma$, the component of $n_\gamma$ parallel to n (from which $n_\gamma$ can be determined, since by symmetry $n_{\gamma c}$ lies in the $(n, n_e)$ plane). There is an easier way, which, moreover, will be of value when evaluating the integral over $n'_e$. Suppose m is a vector in the $(n, n_e)$ plane. Let $\eta$ be the angle between m and $n_\gamma$. Then $m \cdot n_\gamma = \cos \eta$. If now one changes $n_\gamma$ to $n_\gamma + dn_{\gamma\|}$, this corresponds to rotating $n_\gamma$ in the $(n, n_e)$ plane. Since $d(m \cdot n_\gamma)/d\eta = -\sin \eta = -(1-\cos^2 \eta)^{1/2} = -(1-(m \cdot n_\gamma)^2)^{1/2}$, and since $n_\gamma$ has unit length (so that $d\eta = dn_{\gamma\|}$), it follows that $d(m \cdot n_\gamma)/dn_{\gamma\|} = -(1-(m \cdot n_\gamma)^2)^{1/2}$. Hence, $\partial(n \cdot n_\gamma)/\partial n_{\gamma\|} = -(1-(n \cdot n_\gamma)^2)^{1/2}$, $\partial(n_\gamma \cdot n_e)/\partial n_{\gamma\|} = -(1-(n_\gamma \cdot n_e)^2)^{1/2}$.

Varying F with respect to $n_{\gamma\|}$ shows that $n_{\gamma c}$ satisfies $$\gamma(1-(n \cdot n_\gamma)^2)^{1/2}(n_\gamma \cdot n_e) = (1-(n_\gamma \cdot n_e)^2)^{1/2}$$

and $$\gamma(1-n \cdot n_\gamma^2)^{1/2}(n \cdot n_\gamma n \cdot n_e - (1-n \cdot n_\gamma^2)^{1/2}(1-n \cdot n_e^2)^{1/2}) = n \cdot n_\gamma(1-n \cdot n_e^2)^{1/2} + n \cdot n_e(1-n \cdot n_\gamma^2)^{1/2}$$

(The notation has been simplified so that $n \cdot n_\gamma^2 = (n \cdot n_\gamma)^2$ and $n \cdot n_e^2 = (n \cdot n_e)^2$.) Solving for $(1-n \cdot n_\gamma^2)^{1/2}$ the result is:

$$(1-n \cdot n_{\gamma c}^2)^{1/2} = \frac{n \cdot n_e(n \cdot n_\gamma - \gamma^{-1}) - (n \cdot n_e^2(n \cdot n_\gamma - \gamma^{-1})^2 - 4(1-n \cdot n_e^2)n \cdot n_\gamma/\gamma)^{1/2}}{2(1-n \cdot n_e^2)^{1/2}}$$

By taking $n \cdot n_\gamma = 1$ on the right-hand side of the equation, and knowing $n \cdot n_e$ and $\gamma$, a very accurate value for $n \cdot n_{\gamma c}$ is obtained on the left-hand side of the equation, which can be improved by iteration if necessary. From $n \cdot n_\gamma$ we have $n_\gamma \cdot n_e = n \cdot n_\gamma n \cdot n_e - (1-n \cdot n_\gamma^2)^{1/2}(1-n \cdot n_e^2)^{1/2}$, and hence F for $n_\gamma = n_{\gamma c}$ and $G = 1$. (When solving the quadratic equation, the minus sign is chosen in order to obtain the correct limit as $n \cdot n_e \to 1$.)

Now it is necessary to ascertain for which value $n \cdot n_{eg}$ of $n \cdot n_e$ $G_c = 1$. For $n \cdot n_e < n \cdot n_{eg}$, $G < 1$ and F will decrease more rapidly than any corresponding increase in the other factors. Hence, $G_c = 1$ fixes $n \cdot n_{\gamma c}$ for $n \cdot n_e < n \cdot n_{eg}$. Thus setting $G_c = 2n \cdot n_\gamma n \cdot n'_e/n_\gamma \cdot n'_e = 1$ results in $$n_\gamma \cdot n_e = 2n \cdot n_\gamma(2n \cdot n_\gamma n_\gamma \cdot n_e - n \cdot n_e),$$

from which it follows that $$(1-n \cdot n_{\gamma g}^2)^{1/2} = n \cdot n_\gamma n \cdot n_e(1-2(4n \cdot n_\gamma^2 - 1)^{-1})(1-n \cdot n_e^2)^{-1/2}$$

which as above can be solved for $n \cdot n_{\gamma g}$ in a few iterations. Here $n_{\gamma g}$ is $n_\gamma$ for $G_c = 1$ given $n_e$. Equating the expression for $n_{\gamma c}$ and $n_{\gamma g}$, results in an expression for $n_{eg}$ $$n \cdot n_{eg} = (1+\gamma(2n \cdot n_\gamma(4n \cdot n_\gamma^2 - 1)^{-1} - \gamma^{-1})(1-2(4n \cdot n_\gamma^2 - 1)^{-1}))^{-1/2}$$

where $n \cdot n_\gamma = n \cdot n_{\gamma g}$ for $n \cdot n_e = n \cdot n_{eg}$. Since $n \cdot n_{\gamma g}$ is nearly unity, $$n \cdot n_{eg} \approx (1+(2\gamma/3 - 1)/3)^{-1/2}$$

These expressions enable us to evaluate $F_{max}$ for all $(n, n_e)$ pairs. Values for $F_m/F_0$ are given in Table 1, where $F_m = F_{max}$ and $F_0$ is F at the angle for specular reflection ($n \cdot n_\gamma = 1$). In Table 1, $\theta_e$ is the angle of reflection of interest relative to the nominal-surface normal ($n \cdot n_e = \cos\theta_e$), $\theta_i$ is the incident angle which maximizes the reflectance into $\theta_e(n \cdot n'_e(n_{\gamma c}) = \cos\theta_i)$, and $F_m/F_0$ is the ratio of the reflectance from light incident at $\theta_i$ to that incident at $\theta_e$, i.e., nominal specular reflection. The smaller $\gamma$, the greater the fluctuation permitted in the facet normals, and hence the greater angle as well as magnitude of off-specular scattering which results. The horizontal lines in the table distinguish regions where the maximum reflection occur for $G_c > 1$ (smaller angles) and $G_c = 1$ (larger angles). For the latter, the location of the maxima is independent of $\gamma$, the key parameter in Gaussian distributions. Unlike TSRM, due to masking and shadowing the reflection goes rapidly to zero as the incident angle exceeds $\theta_i$. Also, the magnitude of the enhancement is significantly reduced. The former is expected from physics, and is absent in the TSRM. In the TSRM it results from incorrectly calculating the scattered flux. The latter presumable results from not including the appropriate Frensnel factor.

TABLE 1

| | $\gamma = 5$ | | $\gamma = 10$ | | $\gamma = 20$ | |
|---|---|---|---|---|---|---|
| $\theta_e$ | $\theta_i$ | $F_m/F_0$ | $\theta_i$ | $F_m/F_0$ | $\theta_i$ | $F_m/F_0$ |
| 00.00 | 00.00 | 1.000 | 00.00 | 1.000 | 00.00 | 1.000 |
| 18.20 | 27.98 | 1.014 | 22.45 | 1.006 | 21.14 | 1.002 |
| 25.84 | 41.01 | 1.032 | 32.20 | 1.014 | 28.79 | 1.006 |
| 31.79 | 52.73 | 1.057 | 40.10 | 1.023 | 35.62 | 1.010 |
| 36.87 | 65.84 | 1.093 | 47.21 | 1.034 | 41.54 | 1.015 |
| 41.41 | 73.80 | 1.150 | 54.04 | 1.049 | 46.98 | 1.022 |
| 45.57 | 75.19 | 1.200 | 60.98 | 1.070 | 52.14 | 1.030 |
| 49.46 | 76.49 | 1.254 | 68.67 | 1.099 | 57.18 | 1.039 |
| 53.13 | 77.71 | 1.286 | 77.71 | 1.147 | 62.18 | 1.054 |
| 56.63 | 78.88 | 1.322 | 78.88 | 1.204 | 67.45 | 1.073 |
| 60.00 | 80.00 | 1.355 | 80.00 | 1.256 | 73.30 | 1.103 |
| 63.26 | 81.09 | 1.382 | 81.09 | 1.303 | 81.09 | 1.154 |
| 66.42 | 82.14 | 1.408 | 82.14 | 1.344 | 82.14 | 1.224 |
| 69.51 | 83.17 | 1.430 | 83.17 | 1.380 | 83.17 | 1.286 |
| 72.54 | 84.17 | 1.448 | 84.17 | 1.413 | 84.17 | 1.341 |
| 75.52 | 85.17 | 1.464 | 85.17 | 1.439 | 85.17 | 1.389 |
| 78.46 | 86.15 | 1.477 | 86.15 | 1.461 | 86.15 | 1.428 |
| 81.37 | 87.13 | 1.487 | 87.13 | 1.478 | 87.13 | 1.457 |
| 84.26 | 88.09 | 1.494 | 88.09 | 1.487 | 88.09 | 1.477 |
| 87.13 | 89.05 | 1.499 | 89.05 | 1.492 | 89.05 | 1.490 |
| 88.85 | 89.62 | 1.507 | 89.62 | 1.496 | 89.62 | 1.496 |

Now, evaluate the integral over $n'_e$. Having factored the spherical harmonic $Y_{lm}(n'_{ec})$ out of the integral in $R_{lm}(n_e,n)$, the remaining integral I is $$I = \int dn'_e \exp(H(n \cdot n_{6s}, n_\gamma \cdot n_e)), \quad H = \gamma n \cdot n_\gamma - \ln((n_\gamma \cdot n_e)/G)$$

As $\partial H/\partial n_{\gamma\|}=0$ determines $n_\gamma = n_{\gamma c}$, and $\partial H/\partial n_{\gamma\perp}=0$ for $n_\gamma = n_{\gamma c}$ by symmetry, we can write approximately that $$I = \exp(H_c) \int dn'_e \exp\left(-\frac{1}{2}\left(A_\|\left(n'_{e\|} - n'_{e\|c}\right)^2 + A_\perp n'^2_{e\perp}\right)\right),$$

$$I = 2\pi \exp(H_c)/(A_\| A_\perp)^{1/2}, \quad H_c = H(n \cdot n_{\gamma c}, n_{\gamma c} \cdot n_e)$$

Here $A_\| = -\partial^2 H/\partial n'^2_{e\|}$, and $A_\perp = -\partial^2 H/\partial n'^2_{e\perp}$, both evaluated for $n_\gamma = n_{\gamma c}$. The cross term $\partial^2 H/\partial n_{\gamma\|}\partial n_{\gamma\perp}$ is zero by symmetry.

To evaluate $A_\|$ and $A_\perp$ we use a variety of simplifications. First, changing $n_\gamma$ to $(n_\gamma + dn_{\gamma\perp})$, it is necessary to include a factor of $(1 + dn_{\gamma\perp}^2)^{-1/2} \approx 1 - dn_{n\perp}^{-2}/2$ to preserve the normalization. Thus $\partial n_\gamma/\partial n_{\gamma\perp}=0$ and $\partial^2 n_\gamma/\partial n^2_{\gamma\perp} = -n_\gamma/2$. (Also $\partial^2 n_\gamma/\partial n_{\gamma\|}\partial n_{\gamma\perp}=0$.) To obtain the $\partial^2 n_\gamma/\partial n'^2_{e\perp}$ recall that $dn'_{e\perp} = 2(n_\gamma \cdot n_e)dn_{\gamma\perp}$. Thus (for G=1) $A_\perp$ becomes $$A_\perp = -\frac{1}{4}\left(\gamma \frac{1}{n_\gamma \cdot n_e}\frac{\partial}{\partial n_{\gamma\perp}}\left(\frac{1}{n_\gamma \cdot n_e}\frac{\partial n \cdot n_\gamma}{\partial n_{\gamma\perp}}\right) - \frac{1}{n_\gamma \cdot n_e}\frac{\partial}{\partial n_{\gamma\perp}}\left(\frac{1}{n_\gamma \cdot n_3}\frac{\partial \ln(n_\gamma \cdot n_e)}{\partial n_{\gamma\perp}}\right)\right)$$

where $\partial(n \cdot n_\gamma)/\partial n_{\gamma\perp}=0, \partial^2(n \cdot n_\gamma)/\partial n^2_{\gamma\perp} = -(n \cdot n_\gamma)/2$, and similarly for $(n_\gamma \cdot n_e)$. Evaluating one finds $A_\perp = (\gamma n \cdot n_{\gamma c} - 1)/8 (n_{\gamma c} \cdot n_e)^2$ For $A_\|$ recall that $dn'_{e\|} = 2dn_{\gamma\|}$ and that $\partial(n \cdot n_\gamma)/\partial n_{\gamma\|} = -(1 - (n \cdot n_\gamma)^2)^{1/2}$. A similar calculation, also for G=1, yields $$A_\| = \frac{1}{4}\left(\gamma n \cdot n_{\gamma c} - (n_{\gamma c} \cdot n_e)^{-2}\right)$$

Although the second term on the right appears to become large as $n \cdot n_e$ decreases, it will be apparent that taking G=1 is no longer correct. As the dependence is not a particularly sensitive one compared to the spherical-harmonic dependence, approximate $$A_\| \approx \frac{1}{4}(\gamma \cdot n_{\gamma c} - 1)$$

as an upper bound. Combining the above finally that results $$R^*_{lm}(n_e,n) = 2^{1/2}\gamma e^{\gamma n \cdot n_{\gamma c}} Y_{lm}(n'_{ec})/(\gamma n \cdot n_{\gamma c} - 1)(e^\gamma - 1)$$

where $n'_{ec} = 2n_{\gamma c}(n_{\gamma c} \cdot n_e) - n_e$.

Harmonic Representation

The approximation that the spherical harmonic $Y_{lm}(n'_e)$ is relatively constant over the most significant portion of the integral over $n'_e$ is clearly not accurate for sufficiently large l. Consider the simpler case of $n_e = n$: reflection in the normal direction. Define $$I_l(\gamma) = \int dn'_e e^{\gamma n \cdot n_\gamma} G(n \cdot n'_e) Y_{10}(n'_e)/4\pi n_\gamma - 2\pi((2l+1)/4\pi)^{1/2} \int 2^{-1/2} du e^{\gamma u} P_l(2u^2 - 1)g(u)$$

where $P_l(x)$ is the Legendre function of order l:

$$P_l(x) = d^l(x^2-1)^l/dx^l/2^l l!$$

and where g(u)=1 for $3^{1/2}/2 \leq u \leq 1$, and $g(u) = 2(2u^2-1)$ for $2^{1/2}/2 \leq u \leq 3^{1/2}/2$. Note that $I_l(\gamma) = NR_{10}(n,n)$. Let $I^*_l(\gamma)$ be $I_l(\gamma)$ with $P_l(2u^2-1)$ set equal to its value for u=1, that is set to unity. Then the ratio $$I_l/I^*_l(\gamma)$$

gives a measure of the reduction of $R_{lm}$ with increasing l.

While one can evaluate $I_l(\gamma)$ completely, consider the following simplification. For large $\gamma$, only the portion $P_l(u)$ of near u=1 will matter. Now $P_l(1)=1$ for all l, and $$P'_l(1) = lP_l(1) + P'_{l-1}(1)$$

according to the standard recursion relation $xP'_n(x) - P'_{n-1}(x) = nP_n(x)$.

Thus $P'_l(1) = l(l+1)/2$, and for l>0 we can replace $P_l(x)$ with $a_l x + b_l$, $x_l \leq x \leq 1$, $x_l = -b_l/a_l$, $a_l = l(l+1)/2$, $b_l = 1 - a_l$, a straight line with slope $a_l$. After a little algebra one obtains $$I_l(\gamma) \approx ((2l+1)\pi)^{1/2}(e^\gamma/\gamma)(1 - h^{-1} + e^{-h}/h)$$

with $h = 2\gamma/l(l+1)$. Comparing with $$I^*_l(\gamma) = ((2l+1)\pi)^{1/2}(e^\gamma - 1)/\gamma$$

where $Y_{lm}(1)$ is pulled out of the integrand, one can replace the $R^*_{lm}(n_e,n)$ given above with $$R_{lm}(n_e,n) = I_l(\gamma) R^*_{lm}(n_e,n)/I^*_l(\gamma)$$

to correct for the l-dependence of $Y_{lm}(n'_e)$ in the integral over facets. The $I/I^*$ goes as $h/2(1-e^{-\gamma})$ for h small.

A complete evaluation of $I_l(\gamma)$ is performed. To do this we make use of several expressions: First, we can write any Legendre polynomial in the form $$P_l(x) = \sum_{r=0}^{[l/2]} (-1)^r (2l-2r)! x^{l-2r} / 2^l r! (l-r)! (l-2r)!$$

Here [z]=the greatest integer contained in z.
Second, we will need the binomial expansion for $(2u^2-1)$ $$(2u^2-1)^{l-2r} = \sum_{k=0}^{l-2r} (l-2r)! (2u^2)^k (-1)^{l-k} / k! (l-2r-k)!$$

Third, the indefinite integral $$\Gamma(u; \gamma, k) = \int du e^{\gamma u} u^{2k} = (e^{\gamma u}/\gamma^{2k+1}) \sum_{n=0}^{2k} (-\gamma u)^{2k-n} (2k)!/(2k-n)!$$

Finally, defining $$I_l(b, a) = \int_a^b du e^{\gamma u} P_l(2u^2 - 1)$$

$$I_{gl}(b, a) = \int_a^b du e^{\gamma u} 2(2u^2 - 1) P_l(2u^2 - 1)$$

we can write $I_f(\gamma) = I_f(1,3^{1/2}/2) + I_{gf}(3^{1/2}/2, 2^{1/2}/2)$ yielding $R_{lm}(n_e,n) \approx R^*_{lm}(n_e,n) I_f(\gamma)/I^*(r)$, with $I^*(\gamma) = I^*(1,3^{1/2}/2) + I^*_g(3^{1/2}/2,2^{1/2}/2)$, $I^*(u) = \exp(\gamma u)/\gamma$, and $I^*_g(u) = \exp(\gamma u) (\gamma^2 u^2 - 2\gamma u + 2)/\gamma^3$. After some algebra, we find the indefinite integrals $I_l(u)$ and $I_{gl}(u)$ in $I_l(b,a)$, respectively to be $$I_l(u) = \sum_{k=0}^{l} C_0(l, k) \Gamma(u; \gamma, k)$$

$$I_{gl}(u) = -2C_0(l, 0) e^{\gamma u}/\gamma + 2 \sum_{k=1}^{l+1} C_1(l, k) \Gamma(u; \gamma, k)$$

$$C_0(l, k) = \sum_{r=0}^{[(l-k)/2]} \frac{(-1)^{l+r-k}(2l-2r)!}{2^{l-k} r! (l-r)! k! (l-2r-k)!}$$

$$C_1(l, k) = \sum_{r=0}^{[(l-k+1)/2]} \frac{(-1)^{l+r-k+1}(2l-2r)!(l-2r+1)}{2^{l-k} r!(l-r)! k!(l-2r-k+1)!}$$

From these the l-dependent factor $I_f(\gamma)/I^*_f(\gamma)$ follows.

The method of deriving the reflectance function described above is used in the object recognition process. To match an input image with an object model in the database, the object model must be positioned to match the position of the input image. There are standard methods of performing this function known in the art, though a preferred method is disclosed in U.S. patent application Ser. No. 09/538,209, filed Mar. 30, 2000, entitled "Method for Matching a Two Dimensional Image to One of a Plurality of Three Dimensional Candidate Models in a Database", the disclosure of which is hereby incorporated by reference.

Once positioned, images of the model are rendered under each of one or more spherical harmonic components of light as described above. These component rendered images can be linearly combined to arrive at an optimal rendered image of the model. An optimal rendered image means a rendered image that most closely approximates the input image. The comparison of the various rendered images to the input image preferably is made by calculating the Euclidian Distance between the images, in a manner that is known in the art. The optimization is performed by a least squares fit technique between the vector that is the reflectance function and the matrix that represents the input image, also known in the art.

Other steps follow the optimization in the recognition process. One is computing some measure of similarity between the input image and the optimal rendered image for each model. Preferably, this is accomplished be measuring the Euclidian Distance between each optimal image and the input image. The object model whose optimal rendered image is nearest the input image, assuming some threshold value of similarity must be reached, is a match to the input image.

While the reflectance function of the present invention is described in application to the field of machine vision, it is not limited to that field. There are numerous parallels between this work and advances in the field of computer graphics, and our invention has applicability there as well. The field of computer graphics is continually striving to produce more realistic rendered images based on object models that exist only in the computer. The reflectance function of the present invention advances that work as well.

In summary, in accordance with the teachings of the present invention, there have been derived several harmonic expressions for the Torrance-Sparrow model of off-specular reflection. In the process there is a significantly simplification of both the derivation and the expression of the results of their model and restored reciprocity between incidence and reflection. There is noted an insensitivity of the position and magnitude of the off-specular reflection at large angles to the distribution of facet normals. This result is an advancement of the existing state of the art, since results which are too sensitive to parametric models are unreliable. Also results significantly different from those predicted would necessitate a qualitatively different model.

While there has been described a method of modeling the off-specular reflection of light to allow a machine to recognize the image of an object illuminated by varying unknown lighting conditions, it will be apparent to those skilled in the art that variations and modifications are possible without deviating from broad teachings of the present invention which shall be limited solely by the scope of the claims appended hereto.

What is claimed is:

1. A method of deriving the reflectance function of an object model under a variety of lighting conditions, the object model comprising a plurality of surfaces, each of the surfaces defining a normal vector pointing perpendicularly outward, the method comprising the steps of:

(a) rendering, for a given orientation of the object model, a plurality of images produced by the object model when illuminated by each of a plurality of spherical harmonic components of incident light, wherein said rendering comprises:

(i) calculating the intensity of incident light components upon the object model, relative to the normal at each surface;

(ii) calculating the intensity of light components diffusely reflected by the model toward the observer;

(iii) calculating the intensity of light components off-specularly reflected toward the observer, relative to the observer's angle with respect to the angle of maximum specular reflection; and (b) defining a reflectance function for the object as a linear combination of said plurality of images.

2. The method according to claim 1, wherein said plurality of spherical harmonic components include the $0^{th}$ order spherical harmonic component of incident light.

3. The method according to claim 1, wherein the object model is a face.

4. The method according to claim 1, wherein said calculating the intensity of light components broadened-specularly reflected toward the observer comprises using a modified Torrance-Sparrow model of the object.

5. The method according to claim 4, wherein the object model is a face.

6. A method of recognizing objects under various lighting conditions comprising the steps of:
   (a) providing a database comprising a plurality of three dimensional models,
   (b) providing an input image,
   (c) positioning each three dimensional model relative to the input image,
   (d) determining, for each three dimensional model, a rendered image which is most similar to the input image, said determining step comprising:
      (i) deriving a reflectance function that describes an approximation of the set of all possible rendered images that each three dimensional model can produce under all possible lighting conditions, said rendered images including both diffusely and off-specularly reflected light, and said reflectance function employs a model of broadened-specular reflectance that accounts for the angle between the direction of maximum specular reflectance; and
      (ii) optimizing the reflectance function to determine rendered image of each model that is most similar to the input image;
   (e) computing a measure of similarity between the input image and each optimal rendered image; and
   (f) selecting the three dimensional model corresponding to the optimal rendered image whose measure of similarity is most similar to the input image.

7. The method of claim 6, wherein the input image is the image of a face.

8. The method of claim 7, where the three dimensional models are models of heads.

9. The method according to claim 6 wherein said off-specular reflectance model comprises a modified Torrance-Sparrow model.

10. The method of claim 9, wherein the input image is the image of a face.

* * * * *